United States Patent Office 3,396,090
Patented Aug. 6, 1968

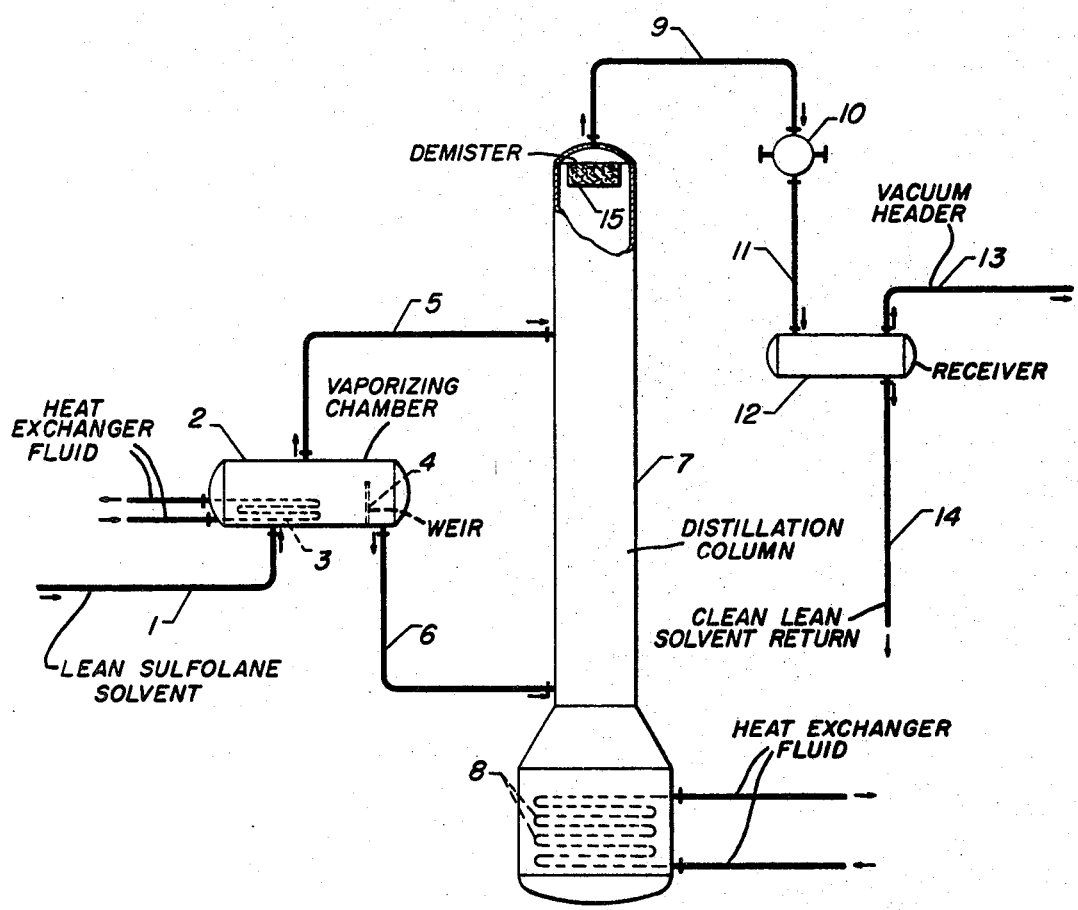

3,396,090
RECOVERY OF SULFOLANE BY DISTILLATION WITH PRE-VAPORIZATION
Harry M. Van Tassell, Arlington Heights, Ill., assignor to Universal Oil Products Company, Des Plaines, Ill., a corporation of Delaware
Filed June 29, 1966, Ser. No. 561,429
5 Claims. (Cl. 203—73)

ABSTRACT OF THE DISCLOSURE

Process for the purification of sulfolane type solvent from an aromatics extraction process by means of a regenerative distillation system. Lean sulfolane solvent is passed to a heated vaporizing chamber wherein preferably at least 80% of the sulfolane type solvent is vaporized. Unvaporized solvent containing relatively non-volatile contaminants passes from the vaporizing chamber to a lower locus near the bottom of a distillation column while clean solvent vapor passes from the chamber to an upper locus near the top of the column.

---

The present invention relates to a separation process for the removal of relatively nonvolatile contaminants from a thermally unstable organic compound. More specifically the present invention relates to the separation of relatively nonvolatile contaminants from a thermally unstable solvent composition of the class utilized in the extraction of aromatic hydrocarbons from mixed hydrocarbon fractions.

The technique of aromatics separation by solvent extraction is well known in the art of hydrocarbon processing. It is further known that the solvents employed in commercial aromatics extraction plants tend to undergo gradual chemical deterioration with continued use, and that a means of solvent regeneration must be employed in order to receover clean solvent from the products of deterioration.

A preferred solvent which may be utilized in such an aromatics extraction process is a solvent of the sulfolane type. The solvent possesses a five membered ring containing one atom of sulfur and four atoms of carbon, with two oxygen atoms bonded to the sulfur atom of the ring. Generically, the sulfolane type solvents may be indicated as having the following structural formula:

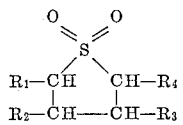

wherein $R_1$, $R_2$, $R_3$, and $R_4$ are independently selected from the group comprising a hydrogen atom, an alkyl group having from one to ten carbon atoms, an alkoxy radical having from one to eight carbon atoms, and an arylalkyl radical having from one to twelve carbon atoms. Other preferred solvents which may be included within this process are the sulfolenes such as 2-sulfolene or 3-sulfolene which have the following structures:

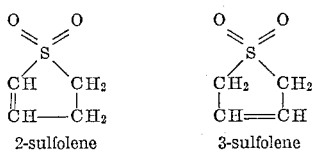

2-sulfolene     3-sulfolene

Other typical solvents which have a high selectivity for separating aromatics from non-aromatic hydrocarbons and which may be processed within the scope of the present invention are 2-methylsulfolane, 2,4-dimethylsulfolane, methyl 2 - sulfonyl ether, n - aryl - 3 - sulfonyl amine, 2 - sulfonyl acetate, diethylene glycol, various polyethylene glycols, dipropylene glycol, various polypropylene glycols, dimethyl sulfoxide, N - methyl pyrrolidone etc. The specifically preferred solvent chemical which is processed within the scope of the present invention is sulfolane, having the following structural formula:

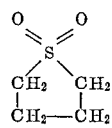

A typical preferred solvent composition comprises a mixture of water and one or more of the organic solvent chemicals. The particularly preferred solvent composition comprises water and sulfolane. In extracting aromatic hydrocarbons from a hydrocarbon mixture, it is known that paraffins are least soluble followed in increasing order of solubility by naphthenes, olefins, diolefins, acetylenes, sulfur containing hydrocarbons, nitrogen containing hydrocarbons, oxygen containing hydrocarbons, and aromatic hydrocarbons. It is the practice to regulate the solubility of the hydrocarbons within the solvent composition by varying the water content thereof. Thus, by adding more water to the solvent, the solubility of all components in the hydrocarbon mixture is decreased, but the solubility difference between components (selectivity) is increased. The net effect is to decrease the number of containing stages required to achieve a given purity of aromatic extract, or to increase the resulting purity of the aromatic extract when the number of contacting stages is held constant. It is therefore the practice to provide that the solvent composition contain from about 0.1% to about 20% by weight of water and preferably from about 0.1% to about 5% water when the solvent system comprises chemical sulfolane.

In the commercial aromatics extraction plants, the rich solvent composition which leaves the extraction zone is sent to a solvent separation zone wherein the hydrocarbon is separated from the solvent. Such solvent separation zone normally comprises one or more distillation columns wherein a non-aromatic fraction is withdrawn for recycle to the extraction zone and the high purity aromatic extract fraction is withdrawn and sent to a subsequent separation zone wherein high purity aromatic chemicals may be recovered. The water content of the rich solvent composition provides a relatively volatile material which is distilled in part from the rich solvent within the solvent separation zone, and which provides an effective means of vaporizing virtually all of the hydrocarbon from the solvent by steam stripping. The resulting lean solvent composition is then recycled to the aromatics extraction zone.

The solvent chemicals utilized in the aromatics extraction process are known to be thermally unstable. The instability is not pronounced, however, and only becomes evident upon prolonged recycling of the solvent whereupon the accumulation of the decomposition products becomes evident. The rate of decomposition increases with increasing temperature. Thus the rate of decomposition of chemical sulfolane in an inert atmosphere is 0.002% per hour at 200° C., 0.010% per hour at 220° C., and 0.020% per hour at 230° C. Similar thermal effects are observed with other solvents and it is therefore desirable to keep temperature levels as low as possible. It is thus the practice with sulfolane solvent systems to set a maximum processing temperature of 350° F. while in diethylene glycol solvent systems and in triethylene glycol solvent systems it is the practice to set a maximum processing temperature of 380° F. with a heat exchanger skin temperature maximum of 450° F. to 500° F. for these specific solvent systems. Thus it is the practice in the art to define such processing temperatures as being the point of thermal instability although it is known that there is some decomposition occurring below such temperature levels. Similar points of thermal instability may be readily ascertained for other solvent systems.

It is known that the solvent decomposition results in the production of acidic organic deterioration products as well as polymerization products having a resinous character. It is further known that the decomposition is accelerated by traces of air. The exact nature of the final decomposition products is not fully known, but where sulfolane is the solvent, the decomposition initially produces sulfur dioxide, sulfur trioxide, and olefins in accordance with the following reactions:

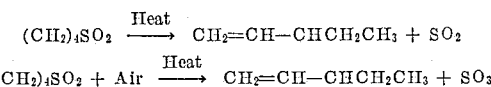

The presence of organic acids within the aqueous solvent and of sulfurous gases within an aqueous sulfolane solvent is known to cause corrosion of the steel equipment utilized, and it is therefore the practice to add organic amine compounds to the solvent composition as corrosion inhibitors. Suitable organic amines for use in the solvent composition of the aromatics extraction process may be selected from the aliphatic, aromatic, naphthenic, and heterocyclic amines generally, as well as the alkanol amines generally, as well as the alkanol amines containing one or more amine groups and/or hydroxyl group per molecule. The amine may also be a primary, secondary, or tertiary amine, but the preferred amine utilized in the solvent composition is an alkanol amine and more particularly monoethanol amine. Because of the basic characteristics of the amine inhibitors, these materials react with the acidic solvent decomposition products to form amine salts and amides at the temperature conditions utilized in the aromatic extraction process.

With continued circulation of the solvent composition within the aromatic extraction process, the solvent tends to accumulate resinous polymeric solvent decomposition products, amine salts of the acidic solvent decomposition products, amides of the acidic solvent decomposition products, and relatively nonvolatile constituents from other sources. This accumulation of relatively nonvolatile contaminants results in the eventual precipitation of tarry insoluble deposits on the interior surfaces of the processing equipment resulting in reduced heat transfer efficiency due to fouling of heat exchangers and resulting in reduced separation efficiencies due to fouling of extractor decks and fractionating column trays.

As used herein, the term "relatively nonvolatile contaminants" refers to any solvent decomposition products or other contaminants which are relatively nonvolatile at a temperature of about 350° F. to 400° F. and a pressure of about 20 mm. of Hg absolute.

It is therefore the practice in aromatics solvent extraction processes to withdraw from the lean solvent recycle stream a slip-stream of the lean solvent for solvent regeneration and recovery of clean lean solvent composition. The withdrawal rate is normally sufficient to provide that the entire solvent inventory of the aromatics extraction process is passed through the solvent regeneration system once every five to ten days. In this manner the relatively nonvolatile contaminants never accumulate to a sufficiently high concentration to cause deposition of tarry insoluble sludge which is otherwise encountered within the solvent circulating system.

The solvent regeneration system normally comprises a distillation column which is operated under maximum vacuum in order to minimize the vaporization temperature of the thermally unstable solvent chemical. Vaporization is accomplished by provision of a reboiler heat exchanger, and solvent vapor containing organic amine and water is removed overhead, condensed, and returned to the aromatics extraction process as a clean lean solvent liquid. Because the solvent chemical is an expensive material, the practice is not to continuously remove a liquid stream from the bottom of the solvent regenerator for to do so would not only result in the removal of the relatively nonvolatile contaminants but it would also result in the loss of valuable solvent chemical. It is therefore the practice to allow the liquid inventory in the bottom of the solvent regenerator to remain within the system and in effect this provides a reservoir wherein all nonvolatile solvent contaminants are accumulated.

The accumulation of the solvent contaminants in the bottom of the solvent regenerator results in the rapid fouling of the reboiler heat exchanger means, necessitating a reduction in the charge rate of lean solvent to the regenerating unit. Upon the fouling of the reboiler heat exchanger means it becomes necessary to shut down the solvent regenerator and discard the liquid inventory of the reboiler. Laboratory analysis of the discarded liquid inventory has disclosed that this liquid is consistently in the neighborhood of 90% pure solvent chemical. Since the solvent chemical is expensive, and since solvent regenerator shutdown and clean-out appears to occur every few weeks, the entire operation is prohibitively expensive.

In order to prolong the duration of solvent regenerator operation it is possible to employ a reboiler heat exchanger of greater surface area or to employ a greater exchanger skin temperature. While use of a larger heat exchanger means is technically feasible, in order to provide a sufficiently long period of operation the exchanger becomes prohibitively large in size and great in cost. Similarly, while a greater exchanger skin temperature may be technically feasible it is undesirable since it will promote increased thermal decomposition of the solvent chemical.

A method of prolonging solvent regenerator operation has also been attempted whereby the reboiler liquid inventory has been pumped through the tubes of the heat exchanger means at high velocity in an attempt to thereby keep the tube surfaces scoured clean. This technique has not proven successful since it appears that the deposits which foul the exchanger surface do not have a discrete particulate structure which can be physically dislodged. Rather the tarry resinous character of the solvent decomposition products causes them to adhere despite the scouring action of a high velocity fluid. In addition it must be noted that a high tube velocity results in a higher pressure drop within the exchanger tubes. This results in a boiling point elevation for the solvent within the tube with the net result that inadequate vaporization results unless the tube skin temperature is increased. Since higher skin temperature accelerates the thermal decomposition of the solvent, high tube velocity reboiler systems have not been effective.

It is therefore the object of the present invention to provide a process for the separation of relatively nonvolatile contaminants from a thermally unstable organic compound. It is a more particular object of the present invention to provide an improved process for the regeneration of a contaminated sulfolane solvent.

Therefore in accordance with the practice of the present invention, a broad embodiment comprises a process for regeneration of a thermally unstable solvent chemical wherein a vaporization chamber is provided before the regenerator distillation means.

A more specific embodiment of the present invention comprises passing a stream of thermally unstable solvent compound containing relatively nonvolatile contaminants into a vaporizing chamber wherein the temperature is maintained below the point of thermal instability of the unstable compound; vaporizing from 50 to 95 percent of said compound within said chamber and passing the resulting vapor stream into a distillation means at a first locus; withdrawing from the vaporizing chamber a liquid portion of the unstable compound containing substantially all of the relatively nonvolatile contaminants and passing said portion into the distillation means at a second locus below said first locus; maintaining said distillation means at conditions sufficient to provide that said unstable compound is vaporized at a temperature below the level of thermal instability; and withdrawing from the top of said distillation means a vapor stream which comprises said thermally unstable compound and which is substantially free from said relatively nonvolatile contaminants.

The process of the present invention may be more clearly understood by referring to the sole figure, which consists of a simplified flow scheme for the solvent regeneration of a sulfolane solvent composition.

A lean solvent stream enters the process of the present invention by means of line 1 and enters a vaporizing chamber 2. The lean solvent stream is comprised of sulfolane and contains from about 0.5 to about 1.0 wt. percent of water, traces of amine corrosion inhibitor, traces of amine salts of acidic sulfolane decomposition products, traces of amides of acidic sulfolane decomposition products, traces of resinous polymeric sulfolane decomposition products, and traces of other relatively nonvolatile contaminants. Vaporizing chamber 2 contains an overflow weir 4 by means of which a liquid inventory is maintained within the chamber in order that heat exchanger coil 3 remain always immersed in liquid lean solvent. Chamber 2 is maintained at conditions sufficient to provide that from 50% to 95%, and normally from 80% to 90%, of the sulfolane solvent is vaporized therein. These conditions require that an absolute pressure of less than 100 mm. of Hg be maintained and that heat exchanger coil 3 provides a temperature below 350° F. in order that thermal decomposition of the sulfolane may be minimized. The preferred conditions maintained within vaporizing chamber 2 comprise a temperature of about 330° F. and pressure of about 20 mm. of Hg absolute. The resulting solvent vapor, comprising sulfolane, water, and amine inhibitor, is withdrawn via line 5 and passed into distillation column 7 at a point in the upper section of the column. The unvaporized solvent composition, comprising sulfolane and substantially all of the relatively nonvolatile contaminants, flows over the top of weir 4 and drains via line 6 into the bottom of column 7.

The bottom of column 7 comprises a liquid reservoir containing a heat exchanger means 8 whereby the nonvolatile contaminants of the solvent may be accumulated while maintaining a constant liquid inventory by continually generating clean solvent vapor at conditions sufficient to minimize thermal decomposition of the sulfolane solvent. These conditions require that an absolute pressure of less than 100 mm. of Hg be maintained and that heat exchanger coil 8 provide a temperature below 350° F. The preferred conditions comprise a temperature of from 340° F. to 350° F. and a pressure of about 20 mm. of Hg absolute.

The solvent vapor passes up through the distillation column which may contain a suitable vapor-liquid contacting means such as Berl Saddles or Raschig rings or fractionation trays. Because of the thermal instability of the sulfolane solvent, it is necessary to provide a vapor-liquid contact means having a low pressure drop in order to avoid elevation of the sulfolane boiling point due to excessive pressure at the bottom of the column. For this purpose sieve decks, side to side pans, or disc and doughnut trays may be used.

The sulfolane vapor passing up through column 7 is joined by the solvent vapor entering the column via line 5 as previously noted. The combined solvent composition vapor, having substantial freedom from nonvolatile contaminants, continues upwards through the vapor-liquid contacting means to the top of the column whereupon it passes through demister 15 and is withdrawn overhead via line 9. The solvent vapor then enters a condenser means 10 wherein the temperature is reduced to about 100° F., and the resulting clean liquid solvent passes by means of line 11 into receiver 12. Receiver 12 is maintained under a vacuum of 5 to 10 mm. of Hg absolute by means of line 13 which pulls water vapor and any air leakage out of the solvent regenerator system. A final clean lean solvent liquid, having substantial freedom from relatively nonvolatile contaminants and comprising sulfolane with traces of water and traces of amine inhibitor, is withdrawn from the inventive process by means of line 14 and, if desired, is returned to the aromatics extraction process for further use.

The problems previously experienced in solvent regenerator systems due to reboiler heat exchanger fouling are overcome by the use of the vaporizing chamber 2. The bulk of the vaporization occurs within this chamber under conditions whereby heat exchanger coil 3 does not become fouled with the tarry resinous deposits of solvent decomposition. Exchanger coil 3 is always immersed in liquid which is continually replenished by the entry of lean solvent. Since there is a continual removal of nonvolatile contaminants by the liquid which passes across the overflow weir 4 and leaves the chamber, the concentration of the relatively nonvolatile solvent decomposition products in the liquid contained within the vaporization chamber 2 never becomes high enough to precipitate the tarry resinous exchanger fouling agents provided that no more than about 95% of the lean solvent is vaporized therein.

The liquid inventory in the bottom of the distillation column accumulates the relatively nonvolatile contaminants. The concentration of the contaminants causes fouling of heat exchanger coil 8, but this exchanger need only vaporize from about 10% to 20% of the lean solvent stream charged to the inventive process. Therefore the exchanger may be made oversized for this reduced service without entailing prohibitive expense. In addition, as the fouling of the exchanger coil 8 progresses, the skin temperature may be progressively increased without subjecting the entire lean solvent charge to the danger of accelerated thermal decomposition. Only the 10% to 20% of the sulfolane solvent charged to the inventive process is normally vaporized by the column reboiler, and thus only this small fraction may be eventually exposed to skin temperatures in excess of 450° F. at the end of the processing period when the fouling has become excessive on exchanger coil 8. Thus it is apparent that the effectiveness of the inventive process over the prior art will be defeated if the vaporization chamber 2 is not maintained at conditions sufficient to provide that only a minor portion of the lean solvent, say less than 50% and preferably only about 10% to 20%, must be vaporized within the distillation column 7.

The basic advantage of the present invention is that the bulk of the solvent chemical is vaporized in a manner that provides low skin temperature and minimum thermal decomposition while removing the relatively nonvolatile contaminants. A minimum loss of solvent is experienced since thermal decomposition is minimized and operation of the solvent regenerator system is prolonged whereby dumping losses are reduced. It must also be noted that by sending the solvent vapor from the vaporization chamber into the distillation column at an upper location and by sending the liquid by a separate conduit directly to the bottom of the column, the pressure drop through the column is reduced and the solvent boiling point within the column is thereby reduced. Other advantages inherent to the inventive process will be readily ascertainable to those skilled in the art.

Although the process of the subject invention has been discussed in reference to solvent regeneration means in an aromatics extraction process, and more specifically to the regeneration of a sulfolane solvent composition, the process is equally applicable to any system whereby a thermally unstable organic chemical must be separated from relatively nonvolatile contaminants. Although the subject invention indicates that the vapor generated within the vaporization chamber enters the distillation column at an intermediate point between distillation trays in the distillation column, this vapor stream could be introduced into the column at a point above all of the trays, or if pressure drop must be eliminated entirely, the column could be void of trays. Similarly, the overflow weir within the vaporization chamber may be eliminated and the liquid inventory within the chamber may be maintained by orienting the liquid outlet conduit in a manner to hold a liquid seal. These and other similar modifications should in on way be construed to detract from the broadness of the present invention.

The invention claimed:

1. Process for regenerating a thermally unstable lean solvent comprising sulfolane type chemical compounds selective for aromatic hydrocarbons and containing non-volatile contaminants, which comprises:
   (a) passing a stream of lean solvent into a vaporization zone wherein the temperature is maintained below the point of thermal instability of said solvent;
   (b) vaporizing from 50 to 95 percent of the lean solvent stream within the vaporization zone and passing the resulting vapor into a distillation means at a first locus;
   (c) withdrawing from the vaporization zone a liquid portion of said lean solvent stream and passing said portion containing substantially all of the non-volatile contaminants into the distillation means at a second locus positioned a substantial distance below said first locus;
   (d) maintaining said distillation means under conditions sufficient to vaporize the lean solvent at a temperature below the point of thermal instability of said solvent;
   (e) withdrawing from the top of said distillation means a solvent vapor which is substantially free from said relatively non-volatile contaminants.

2. Process of claim 1 wherein said vaporization zone and said distillation means are maintained at subatmospheric pressure and at a temperature below 500° F.

3. Process of claim 1 wherein said sulfolane type chemical compound is represented by the general formula:

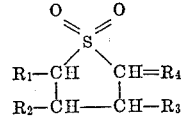

wherein $R_1$, $R_2$, $R_3$, and $R_4$ are independently selected from the group comprising a hydrogen atom, an alkyl group having from one to ten carbon atoms, an arylalkyl radical having from one to twelve carbon atoms, and an alkoxy radical having from one to eight carbon atoms.

4. Process of claim 3 wherein the solvent comprises sulfolane.

5. Process of claim 1 wherein the solvent comprises a sulfolene selected from the group consisting of 2-sulfolene and 3-sulfolene.

References Cited

UNITED STATES PATENTS

| | | | |
|---|---|---|---|
| 2,767,133 | 10/1956 | Shobe | 203—1 |
| 2,768,940 | 10/1956 | Rupp | 203—88 |
| 2,810,728 | 10/1957 | Beesely et al. | 260—332.1 |
| 2,900,312 | 8/1959 | Gilmore | 203—2 |
| 3,252,997 | 5/1966 | Ridderikhoff et al. | 260—332.1 |

WILBUR L. BASCOMB, Jr., *Primary Examiner.*